United States Patent

Sahm et al.

[11] Patent Number: 5,432,026
[45] Date of Patent: Jul. 11, 1995

[54] COOLING SYSTEM FOR HIGH TEMPERATURE BATTERY

[75] Inventors: Dietrich Sahm, Bad Urach; Diether von Scarpatetti, Esslingen, both of Germany; Rodger N. Bull, Mickleover, United Kingdom

[73] Assignee: Daimler-Benz AG, Germany

[21] Appl. No.: 216,889

[22] Filed: Mar. 24, 1994

[30] Foreign Application Priority Data

Mar. 24, 1993 [DE] Germany .................. 43 09 621.2

[51] Int. Cl.⁶ ............................................. H01M 10/50
[52] U.S. Cl. ........................................ 429/120; 429/62; 429/112
[58] Field of Search .................. 429/120, 148, 112, 62

[56] References Cited

U.S. PATENT DOCUMENTS 4,383,013  5/1983  Bindin et al. ........................ 429/120
4,500,612  2/1985  Fujii et al. ............................ 429/120

FOREIGN PATENT DOCUMENTS 2638862  3/1978  Germany .
4141811  2/1993  Germany .

*Primary Examiner*—Stephen Kalafut
*Assistant Examiner*—Carol Chaney
*Attorney, Agent, or Firm*—Evenson, McKeown, Edwards & Lenahan

[57] ABSTRACT

A high-temperature battery for a vehicle with an electric drive and that supplies the electric drive with power has a thermally insulating housing in order to avoid thermal losses. The battery also has a cooling system that limits the operating temperature during the charging and during the power drain. The dissipated heat of the cooling system is used to heat the vehicle. There is provision for the vehicle to be preheated during the charging of the battery so that during the driving mode the temperature to which the passenger compartment has been heated merely has to be maintained. Thus, even when the overall amounts of dissipated heat from the cooling system are low, heating to a comfortable degree is possible.

3 Claims, 3 Drawing Sheets

COOLING SYSTEM FOR HIGH TEMPERATURE BATTERY

BACKGROUND AND SUMMARY OF THE INVENTION

The present invention relates to a high-temperature battery, in particular for supplying power to vehicles with electric drives, having a thermally insulating housing in order to avoid thermal losses and a cooling system in order to limit the operating temperature during charging of the battery and during the power.

In view of their comparatively high energy density, high-temperature batteries are particularly advantageous for electric vehicles. These high-temperature batteries must be thermally well insulated in order to avoid thermal losses. On the other hand, batteries of this kind require a cooling system in order to avoid excessive heating of the battery during the power drain or during the charging of the battery.

In principle, the dissipated heat of the cooling system can be utilized to heat the passenger compartment of a vehicle. However, the quantities of dissipated heat are relatively small in comparison with the required heating power.

Therefore, there is provision according to German Patent Document DE 41 41 811 C1 to preheat the vehicle when charging the battery, that is to say when the vehicle is connected to an external electric mains and, during driving mode, essentially only to maintain the temperature to which the vehicle has been heated and which was already achieved by the preheating. The dissipated heat of the high temperature is usually sufficient to maintain the temperature to which the vehicle has been heated.

Here, the general idea of using the dissipated heat of the cooling system of the battery as a parked vehicle heater when the battery is being recharged so that the passenger compartment of the vehicle can be heated during the charging phase is realized.

Under climatically very unfavorable conditions, additional electric heating of the vehicle can be carried out via the electric mains from which the battery is recharged.

Furthermore, the thermal energy of the high temperature battery can also be exploited by permitting, during the charging of the battery, a temperature rise up to the maximum acceptable operating temperature. In this way, it can then be made possible for an appropriately increased quantity of heat to be exploited for heating the vehicle while driving, by means of the cooling system-of the battery.

With respect to the cooling system in the case of air cooling a battery it is known from German Patent Document DE-A 26 38 862 to provide cooling air channels enclosed within the battery and in particular to avoid a connection to the charging openings of the battery cells so that the gases released by the battery cells cannot get into the passenger compartment. This gives the cooling system an overall constructionally complex structure.

An object of the invention is to simplify constructionally the cooling of a high-temperature battery with the highest possible degree of protection against gases and vapors or the like escaping.

This and other objects are achieved according to the invention in that, in order to remove heat from the battery, a cooling element through which air flows is arranged inside the thermally insulating battery housing, is hermetically sealed and only penetrates the thermally insulating wall of the battery housing with air inlet and air outlet connecting elements arranged on it. Here, according to a certain preferred embodiments of the invention, there is provision for the cooling element to be constructed essentially in the form of a plate-shaped hollow element with the plate in a horizontal plane.

The cooling element can then be prefabricated as a constructional unit and be mounted as a complete unit when the battery housing is installed so that there is a significant overall reduction in manufacturing complexity. At the same time, a high degree of protection against gases and vapors and the like escaping is provided.

Construction of the cooling element as a plate shaped hollow body provides the particular advantage that on the one hand, if necessary, relatively large quantities of heat can be absorbed and conducted away by virtue of a structure with a large surface. On the other hand, only a virtually negligible convection flow occurs within the hollow element so that, without special measures, an undesired heat loss to the outside can be avoided, for example if it is not necessary to cool the battery. Essentially, appreciable quantities of heat can only be removed from the battery if the cooling element is positively ventilated by means of a blower or the like.

Other objects, advantages and novel features of the present invention will become apparent from the following detailed description of the invention when considered in conjunction with the accompanying drawings.

DETAILED DESCRIPTION OF THE DRAWINGS

Figure 1:
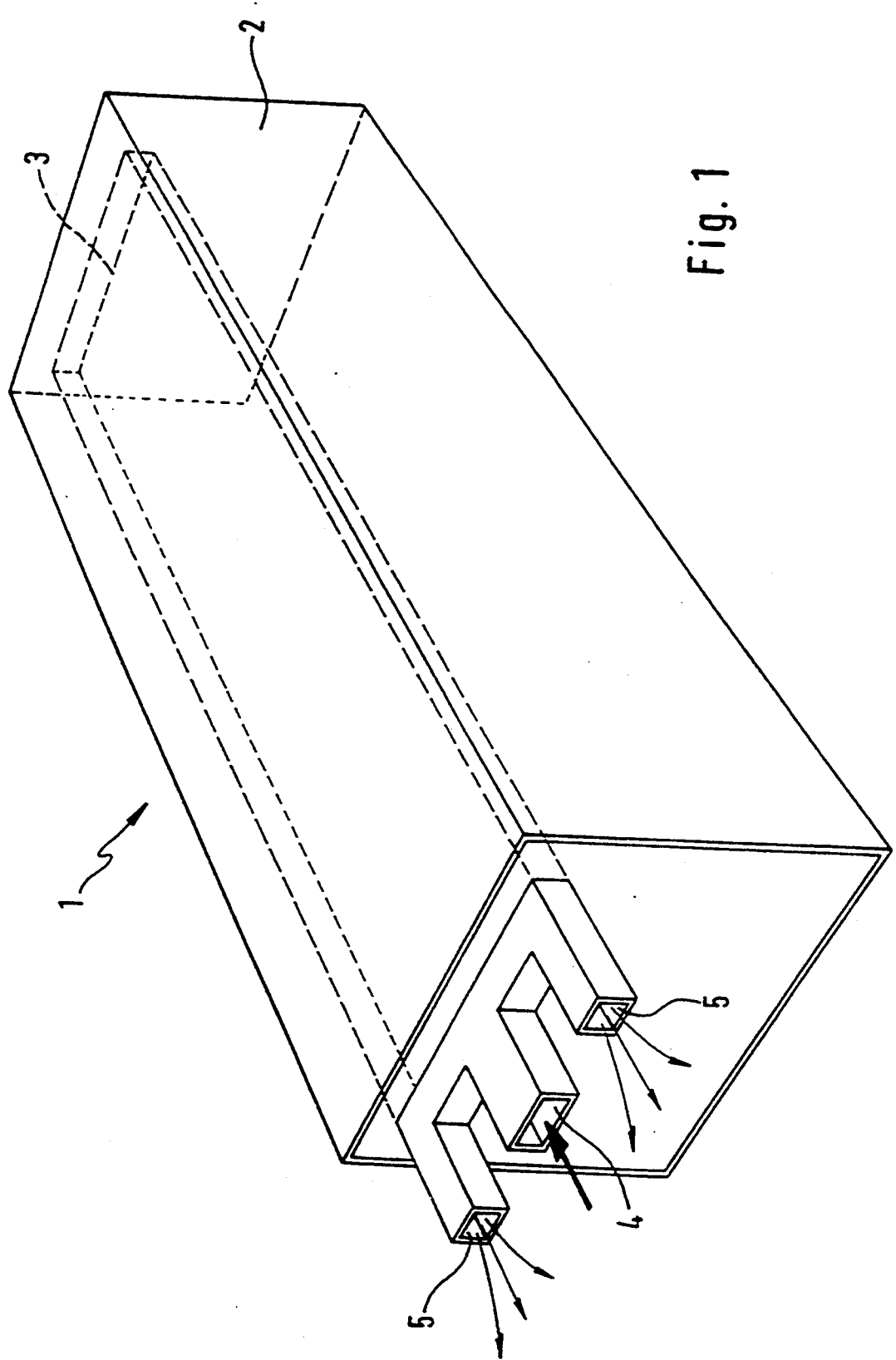
FIG. 1 shows an view of a high-temperature battery with cooling element through which air flows, constructed in accordance with the present invention.

The high-temperature battery 1 which is illustrated in FIG. 1 and can be formed for example in a basically known manner by a sodium nickel chloride system has a thermally insulating housing 2 so as to avoid heat losses if possible.

The operating temperature of the battery 1 is between for example 250° and 370° C. During the power drain from the battery and during the charging of the battery 1, a relatively high increase in temperature of the battery 1 occurs due to the inner electrical resistance of the battery 1. For this reason, the battery 1 must have a cooling system in order to be able to avoid an excessive rise in temperature.

For this purpose, according to certain preferred embodiments of the invention, an essentially plate-shaped cooling element 3 through which air flows is arranged inside the housing 2, in its upper region. This cooling element 3 has an air inlet connecting element 4 and two air outlet connecting elements 5. Only the air inlet and air outlet connecting elements 4 and 5 penetrate the wall of the housing 2, otherwise the cooling element 3 is arranged completely inside the housing 2.

Figure 2:
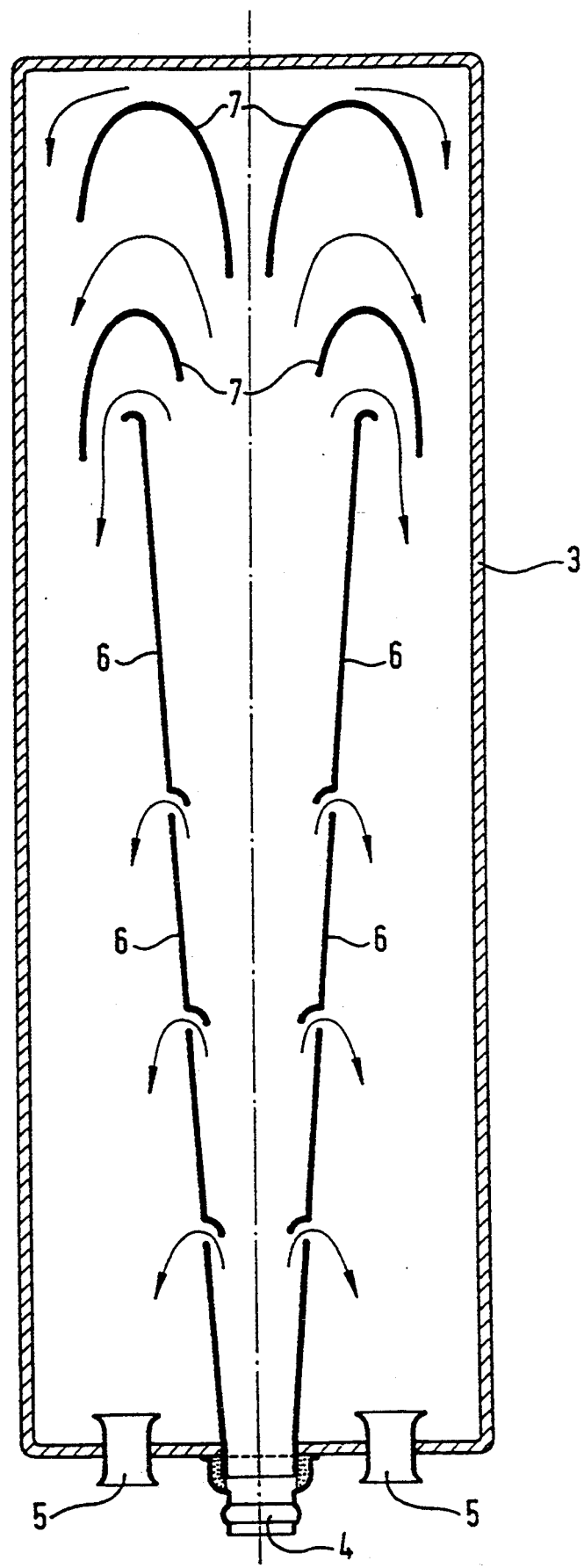
FIG. 2 shows a horizontal section of the cooling element.

According to FIG. 2, air baffles 6 and 7 are arranged inside the cooling element 3, through which air baffles the air fed via the air inlet connecting element 4 is distributed inside the cooling element 3 in such a way that all the regions of the cooling element 3 have approximately the same cooling effect.

Figure 3:
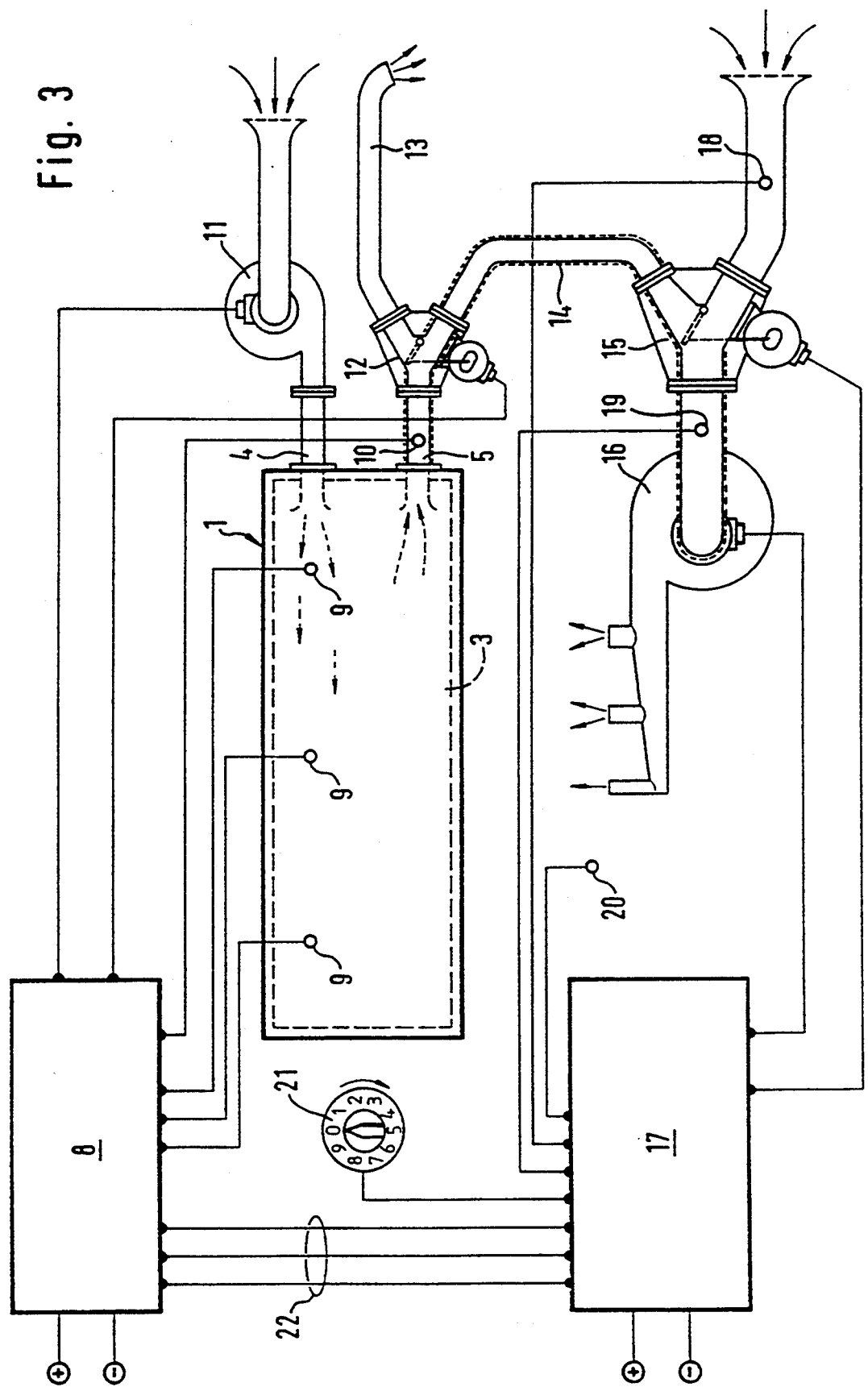
FIG. 3 shows a diagrammatic view of a vehicle heating system in which the dissipated heat of a high-temperature battery is exploited in accordance with the present invention.

According to FIG. 3, the battery 1 has a monitoring circuit 8 which is connected to a plurality of temperature sensors 9, for example three, in the interior of the housing 2 of the battery and to a further temperature sensor 10 in order to monitor the air flowing out of the cooling element 3. The monitoring circuit 8 controls a cooling blower 11 which is assigned to the air inlet connecting element 4 of the cooling element 3. Furthermore, the monitoring circuit 8 also controls a change-over valve 12 with which the air which emerges from the air outlet connecting element 5 of the cooling element 3 is directly conducted away to the outside via a blow-off line 13 or can be fed via a thermally insulated line 14 to an air mixer 15. The air mixer 15 is arranged on the input side of a heating blower 16 with which the passenger compartment of the vehicle can be supplied with heating air.

A control circuit 17 is connected to different temperature sensors 18, 19, 20 for determining the temperature of the external air, the temperature of the heating air, i.e. the air fed to the heating blower 16 and the temperature of the passenger compartment. The control circuit 17 serves to control the heating system of the vehicle. This control circuit 17 controls the heating blower 16, and the servomotor of the air mixer 15 so that a greater or lesser amount of fresh air is mixed with the hot air fed via the line 14. Moreover, the control circuit 17 is connected to a temperature set-point value transmitter 21.

The control circuit 17 and the monitoring circuit 8 are interconnected for the exchange of data via lines 22 so that the monitoring circuit 8 "knows" whether there is a need for heating. On the other hand, the control circuit 17 "knows" the temperature of the battery 1 and the air fed out of the cooling element 3.

The operation of the battery 1 can be matched to the respective circumstances on the basis of the exchange of data between the monitoring circuit 8 and the control circuit 17. If there is no need for heating at all, the temperature of the battery 1 is held at a level which is optimum for simply supplying the electric drive of the vehicle.

If, on the other hand, there is a need for heating, in particular when charging the battery, a high temperature can be permitted or aimed for. In this case, the battery is therefore not only used as a store for electrical energy but also as a heat accumulator.

Since only comparatively little heat can be conducted away from the battery 1 in total during the power drain for driving mode, there is provision according to the invention for the heat which is unavoidably produced when charging the battery 1 to be exploited for preheating the vehicle.

If appropriate, the charging current coming from the electric mains can also operate an electric heating system which is not illustrated, so that even under unfavorable conditions it is ensured that the passenger compartment of the vehicle is already heated up in a desirable fashion before a journey is begun.

Thus, in driving mode, the temperature to which the vehicle has already been heated merely has to be maintained which requires comparatively little quantities of heat, in particular if the passenger compartment of the vehicle has a sufficiently effective heat insulation.

The monitoring circuit 8 and the control circuit 17 cooperate in such a way that priority is given to ensuring a reliable driving mode and a suitable range of the vehicle. This means that priority is usually given to maintaining an optimum operating temperature of the battery and the heat requirement of the vehicle heating system has a lower priority.

Moreover, it is ensured by means of safety circuits that hot air is only conducted out of the cooling element 3 of the battery 1 to the air mixer 15 via the change-over valve 12 when the air mixer 15, the heating blower 16 and the control circuit 17 operate free of faults.

In a modification of the illustrated embodiment, the heat from the battery 1 can also be conducted away in another manner. Instead of the cooling element 3 through which air flows, so-called heat exchanger tubes can also be installed in order to be able to prevent excessive heating up of the battery 1 and conduct the heat away to the outside.

In a modification of the embodiment shown in the drawing, the cooling element 3 can also be arranged in the lower region of the housing 2 of the battery, that is to say under the battery cells.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. High-temperature battery for supplying power to vehicles that have an electric drive, comprising:
   a thermally insulating housing that houses the battery so as to avoid thermal losses, the thermally insulating housing having at least one wall; and
   a cooling system that limits operating temperature during charging of the battery and during power drain of the battery, the cooling system having a cooling element through which air flows to remove heat from the battery, wherein the cooling element is arranged inside the thermally insulating battery housing, is hermetically sealed, has air inlet and air outlet connecting elements, and only penetrates the wall of the thermally insulating housing with the air inlet and air outlet connecting elements;
   wherein the cooling element is a plate-shaped hollow element.

2. High-temperature battery according to claim 1, wherein the plate-shaped hollow element is arranged horizontally above the cells of the high-temperature battery.

3. High-temperature battery according to claim 1, wherein the plate-shaped hollow element is arranged horizontally below the cells of the high-temperature battery.

* * * * *